United States Patent
Wada et al.

(10) Patent No.: US 8,711,122 B2
(45) Date of Patent: Apr. 29, 2014

(54) SENSOR APPARATUS AND INFORMATION PROCESSING APPARATUS

(75) Inventors: Yutaka Wada, Miyagi (JP); Naohiro Takahashi, Tokyo (JP); Takashi Itaya, Miyagi (JP)

(73) Assignee: Sony Corporation, Tokyo (JP)

( * ) Notice: Subject to any disclaimer, the term of this patent is extended or adjusted under 35 U.S.C. 154(b) by 137 days.

(21) Appl. No.: 13/228,686

(22) Filed: Sep. 9, 2011

(65) Prior Publication Data

US 2012/0068965 A1    Mar. 22, 2012

(30) Foreign Application Priority Data

Sep. 17, 2010    (JP) ................................. 2010-209273

(51) Int. Cl.
*G06F 3/045* (2006.01)
*G06F 3/041* (2006.01)

(52) U.S. Cl.
USPC .......................................... 345/174; 345/173

(58) Field of Classification Search
USPC ................................................ 345/173–174
See application file for complete search history.

(56) References Cited

U.S. PATENT DOCUMENTS

| 2001/0024194 A1* | 9/2001 | Shigetaka et al. ............ 345/173 |
| 2002/0101410 A1* | 8/2002 | Sakata et al. .................. 345/173 |
| 2011/0193816 A1* | 8/2011 | Kitakado ....................... 345/174 |

FOREIGN PATENT DOCUMENTS

| JP | 11-212725 | 8/1999 |
| JP | 2000-347807 | 12/2000 |
| WO | WO2009123388 | * 12/2008 |

* cited by examiner

*Primary Examiner* — Vijay Shankar
*Assistant Examiner* — Amit Chatly
(74) *Attorney, Agent, or Firm* — Dentons US LLP

(57) ABSTRACT

A sensor apparatus includes: a sensor panel that includes an input operation surface and is configured to detect positional coordinates of a detection object that comes into contact with the input operation surface; a casing; and a pressure-sensitive sensor that includes a first electrode fixed on the sensor panel side, a second electrode fixed on the casing side, and an elastic member that is provided between the sensor panel and the casing and elastically supports the sensor panel with respect to the casing, includes, between the first electrode and the second electrode, a first area formed with a first capacitance and a second area formed with a second capacitance larger than the first capacitance, and is configured to detect a pressing force input to the input operation surface as a change in a capacitance between the first electrode and the second electrode.

8 Claims, 11 Drawing Sheets

SENSOR APPARATUS AND INFORMATION PROCESSING APPARATUS

BACKGROUND

The present disclosure relates to a sensor apparatus and information processing apparatus that include a pressure-sensitive sensor for detecting an operation pressure.

A touch panel as one of positional sensors for detecting a contact position of a finger or a pen on a display is mounted on various apparatuses as an input interface for a computer. As an input method for the touch panel, various methods such as a resistance film type, a capacitance type, an optical type, an ultrasonic type, and an electromagnetic induction type are proposed. For example, the resistance-film-type touch panel is widely used in many medium- to small-size electronic apparatuses such as a cellular phone and a digital camera due to its low cost. In recent years, however, the capacitance-type touch panel having a gesture function and a multi-touch function is becoming a mainstream input interface for these electronic apparatuses.

Since the capacitance-type touch panel is based on a principle of specifying an adjacency or a contact position of a finger by detecting a change in a capacitance of detection electrodes, not only accuracy in detecting a contact position of a finger is high, but there are also advantages that accuracy in detecting a finger movement is high and durability is high since there is no contact of the detection electrodes. On the other hand, the capacitance-type touch panel is incapable of detecting a pressing pressure since a distance between detection electrodes is fixed. In this regard, various sensor apparatuses in which a touch panel is combined with a sensor having a pressure-sensitive function are proposed.

For example, Japanese Patent Application Laid-open No. 2000-347807 discloses an input device including a moving electrode fixed to a lower surface of a flat input plate, a fixed electrode opposed to the moving electrode, and an elastic holding member interposed between the moving electrode and the fixed electrode. The input device back-calculates a pressing force to the flat input plate by measuring a capacitance between the moving electrode and the fixed electrode. In addition, Japanese Patent Application Laid-open No. Hei 11-212725 discloses an input device that detects, by a plurality of piezoelectric elements provided at four corners of a touch panel, a pressing force input to the touch panel by the piezoelectric elements.

SUMMARY

However, in an input apparatus of the related art having a pressure-sensitive function, there have been large variations in a detection sensitivity (signal intensity) of a pressing force between a circumferential portion and center portion of a panel, which made it difficult to enhance the detection sensitivity at the center portion of the panel in particular. Moreover, even when a total inter-electrode capacitance is increased for enhancing the detection sensitivity at the center portion of the panel, it is difficult to eliminate variations of the detection sensitivity of the entire panel. Furthermore, there is a fear that, by increasing the total capacitance, a processing limit of a control IC that detects a change in the capacitance is exceeded.

In view of the circumstances as described above, there is a need for a sensor apparatus and information processing apparatus with which stable detection characteristics can be obtained irrespective of a pressing position.

According to an embodiment of the present disclosure, there is provided a sensor apparatus including a sensor panel, a casing, and a pressure-sensitive sensor.

The sensor panel includes an input operation surface and is configured to detect positional coordinates of a detection object that comes into contact with the input operation surface.

The pressure-sensitive sensor includes a first electrode fixed on the sensor panel side, a second electrode fixed on the casing side, and an elastic member that is provided between the sensor panel and the casing and elastically supports the sensor panel with respect to the casing, includes, between the first electrode and the second electrode, a first area formed with a first capacitance and a second area formed with a second capacitance larger than the first capacitance, and is configured to detect a pressing force input to the input operation surface as a change in a capacitance between the first electrode and the second electrode.

In the sensor apparatus, the pressure-sensitive sensor includes the first area formed by the first capacitance and the second area formed by the second capacitance larger than the first capacitance. Therefore, the change in the capacitance between the first electrode and the second electrode detected based on a pressing force input to the input operation surface differs between the first area and the second area and is larger in the second area than in the first area. As a result, by setting the second area at a position where a sinking amount of the panel is large at a time an area where a detection sensitivity of a pressing force is low, for example, a sensor apparatus with which stable detection characteristics can be obtained irrespective of a pressing position can be structured.

The input operation surface may have a polygonal shape having at least a pair of opposite sides. In this case, the pressure-sensitive sensor may be formed annularly along sides of the sensor panel and include the second area at a center portion of each of at least the pair of opposite sides and the first area at both ends of each of the sides sandwiching the second area.

With this structure, it is possible to structure a sensor apparatus with which stable detection characteristics can be obtained irrespective of a pressing position with respect to the polygonal input operation surface.

The first capacitance and the second capacitance can be set arbitrarily by adjusting an opposing area, opposing distance, and the like between the first electrode and the second electrode. Therefore, by differentiating, for the first area and the second area, the opposing area or opposing distance between the first electrode and the second electrode, an arbitrary capacity difference can be provided between the first capacitance and the second capacitance. For example, the first electrode and the second electrode face each other with a first opposing area being set in-between in the first area and with a second opposing area larger than the first opposing area being set in-between in the second area. Alternatively, the first electrode and the second electrode face each other with a first opposing distance being set in-between in the first area and with a second opposing distance shorter than the first opposing distance being set in-between in the second area.

The structure of the sensor panel is not particularly limited as long as it can detect positional coordinates of an operation made on the input operation surface, and a capacitance-type sensor panel is used, for example. Various other types of sensor panels such as a resistance film type, an optical type, an ultrasonic type, and an electromagnetic induction type may be used instead.

According to an embodiment of the present disclosure, there is provided an information processing apparatus including a sensor panel, a casing, a pressure-sensitive sensor, and a display panel.

The sensor panel includes an input operation surface and is configured to detect positional coordinates of a detection object that comes into contact with the input operation surface.

The pressure-sensitive sensor includes a first electrode fixed on the sensor panel side, a second electrode fixed on the casing side, and an elastic member that is provided between the sensor panel and the casing and elastically supports the sensor panel with respect to the casing, includes, between the first electrode and the second electrode, a first area formed with a first capacitance and a second area formed with a second capacitance larger than the first capacitance, and is configured to detect a pressing force input to the input operation surface as a change in a capacitance between the first electrode and the second electrode.

The display panel is provided on a back side of the sensor panel and accommodated in the casing.

In the information processing apparatus, the pressure-sensitive sensor includes the first area formed by the first capacitance and the second area formed by the second capacitance larger than the first capacitance. Therefore, the change in the capacitance between the first electrode and the second electrode detected based on a pressing force input to the input operation surface differs between the first area and the second area and is larger in the second area than in the first area. As a result, by setting the second area at an area where a detection sensitivity of a pressing force is low, for example, an information processing apparatus with which stable detection characteristics can be obtained irrespective of a pressing position can be structured.

According to the embodiments of the present disclosure, a sensor apparatus and information processing apparatus with which stable detection characteristics can be obtained irrespective of a pressing position can be provided.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Figure 1:
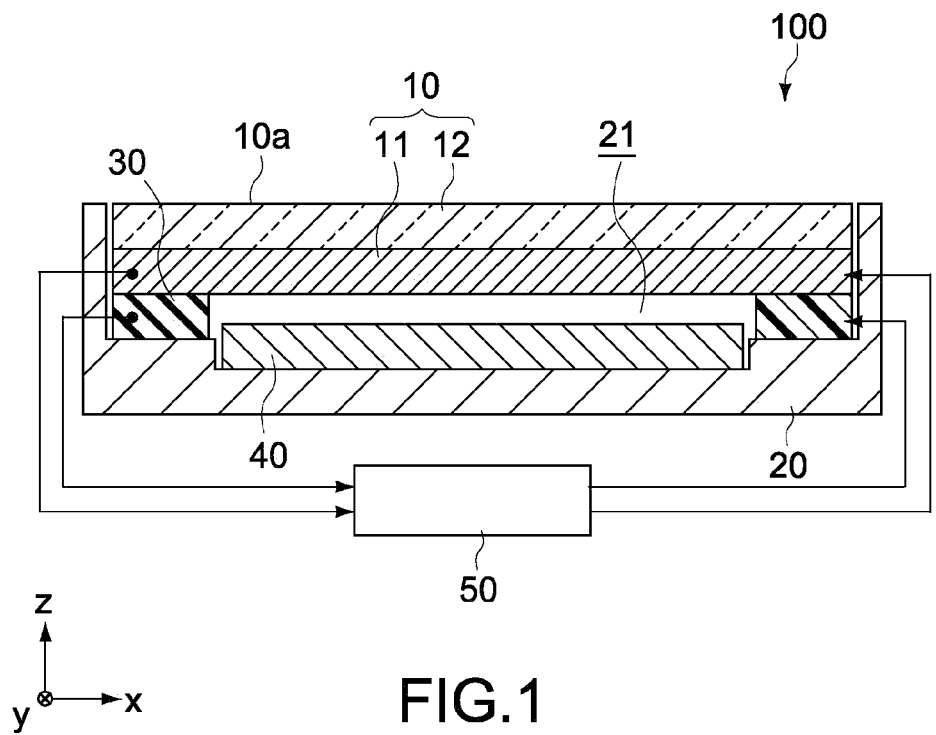
FIG. 1 is a schematic cross-sectional diagram showing an information processing apparatus according to an embodiment of the present disclosure.

FIG. 1 is a schematic cross-sectional diagram showing an information processing apparatus including a sensor apparatus according to an embodiment of the present disclosure. In FIG. 1, x-, y-, and z-axis directions represent triaxial directions orthogonal to one another. Hereinafter, an overall structure of the information processing apparatus will be described.

(Information Processing Apparatus)

The information processing apparatus 100 of this embodiment includes a sensor panel 10, a casing 20, a pressure-sensitive sensor 30, a display panel 40, and a controller 50.

The casing 20 constitutes a casing of the information processing apparatus 100. Examples of the information processing apparatus include handheld information processing apparatuses such as a cellular phone, a portable information terminal, a portable game machine, and a remote controller, though not limited thereto. The information processing apparatus may also be a stationary information processing apparatus.

The casing 20 is constituted of, for example, a plastic compact or a pressed product made from a metal plate. The casing 20 may have a block structure. The casing 20 includes a space portion 21 for accommodating the sensor panel 10, the pressure-sensitive sensor 30, the display panel 40, the controller 50, and the like.

Figure 2:
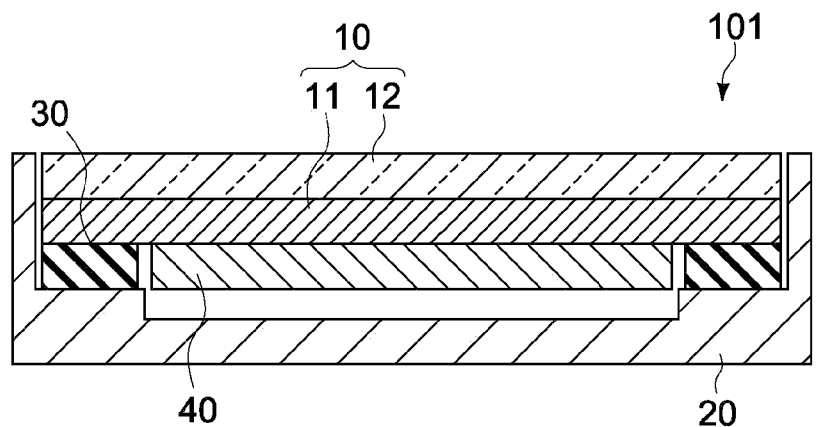
FIG. 2 is a schematic cross-sectional diagram showing another structural example of the information processing apparatus.

The display panel 40 is rectangular and provided in the casing 20 with a long side facing sideways, for example. Display devices such as an LCD (Liquid Crystal Display) panel and an organic EL (Electro-Luminescence) panel are used for the display panel 40, and the display panel 40 externally displays an image via the sensor panel 10. The display panel 40 is fixed to a bottom surface of the space portion 21 of the casing 20. Alternatively, as in an information processing apparatus 101 shown in FIG. 2, the display panel 40 may be fixed to a back surface of the sensor panel 10 (lower surface in FIGS. 1 and 2). A front surface of the sensor panel 10 (upper surface in FIGS. 1 and 2) is formed as an input operation surface 10a, and a user operates the information processing apparatus 100 (or information processing apparatus 101) while visually checking the image of the display panel 40 displayed on the input operation surface 10a.

The controller 50 is electrically connected to the sensor panel 10, the pressure-sensitive sensor 30, the display panel 40, and the like. The controller 50 detects, as well as drive the sensor panel 10 and the pressure-sensitive sensor 30, an operation position of a detection object (e.g., finger of user) and a pressing operation based on a detection signal from the sensor panel 10 and the pressure-sensitive sensor 30. The controller 50 is constituted of a computer and constituted of, for example, a single IC component or a component-mounted body in which various electronic components are mounted on a wiring substrate. The controller 50 may be structured as a part of a control circuit that controls an overall operation of the information processing apparatus 100.

The information processing apparatus 100 includes the sensor panel 10 and the pressure-sensitive sensor 30 that detects a pressing amount with respect to the sensor panel 10. The controller 50 generates a control signal related to a pressing operation with respect to the input operation surface 10a based on the detection signals from the sensor panel 10 and the pressure-sensitive sensor 30.

As the control signal, signals for controlling an image displayed on the display panel 40, signals for controlling various functions of the information processing apparatus 100 (call function, communication function, activation of various applications, etc.), and the like are used.

The sensor panel 10 and the pressure-sensitive sensor 30 constitute a sensor apparatus that detects an input operation of a user with respect to the information processing apparatus 100. The sensor apparatus may include the controller 50. Hereinafter, details of the sensor apparatus will be described.

[Sensor Apparatus]

(Sensor Panel)

The sensor panel 10 has a multilayer structure constituted of a sensor sheet 11 and a top plate 12. The sensor panel 10 has a rectangular shape and provided in the casing 20 with, for example, a long side facing sideways. It should be noted that a planar shape of the sensor panel 10 is not limited to a rectangle and may be other polygonal shapes such as a square.

The sensor sheet 11 is constituted of a capacitance-type touch sensor (touch panel) in this embodiment. The sensor sheet 11 is formed by attaching two transparent electrode substrates (first electrode substrate and second electrode substrate) having rectangular shapes. Alternatively, the sensor sheet 11 may be constituted of a single electrode substrate. In this case, transparent electrode patterns for detecting x and y positions are formed on each surface of a common transparent substrate.

The first electrode substrate includes a transparent plastic film formed of, for example, PET (polyethylene terephthalate) and a first wiring pattern formed on the transparent plastic film. The first wiring pattern includes a plurality of transparent electrode patterns that are arranged at regular intervals in the y-axis direction and extend in the x-axis direction and a peripheral circuit pattern. The second electrode substrate includes a transparent plastic film formed of, for example, PET, and a second wiring pattern formed on the transparent plastic film. The second wiring pattern includes a plurality of transparent electrode patterns that are arranged at regular intervals in the x-axis direction and extend in the y-axis direction and a peripheral circuit pattern.

The top plate 12 is constituted of a transparent plastic plate, glass plate, or the like having a rectangular shape and laminated on a front surface of the sensor sheet 11. The top plate 12 is formed to have almost the same size as the sensor sheet 11 and imparts adequate rigidity to the sensor panel 10 while protecting the sensor sheet 11. A front surface of the top plate 12 is formed as the input operation surface 10a of the sensor panel 10.

The sensor panel 10 electrostatically detects an operator (e.g., finger of user or input pen) as a detection object that approaches or comes into contact with the input operation surface 10a and outputs a detection signal to the controller 50. In other words, the sensor panel 10 has a function of detecting xy coordinates of the operator on the input operation surface 10a.

It should be noted that the sensor panel 10 may be constituted of the sensor sheet alone. In this case, the electrode substrates of the sensor sheet are formed of a transparent material having a relatively-high rigidity such as glass, and the input operation surface is formed on the front surface of the sensor sheet.

(Pressure-Sensitive Sensor)

Figure 3:
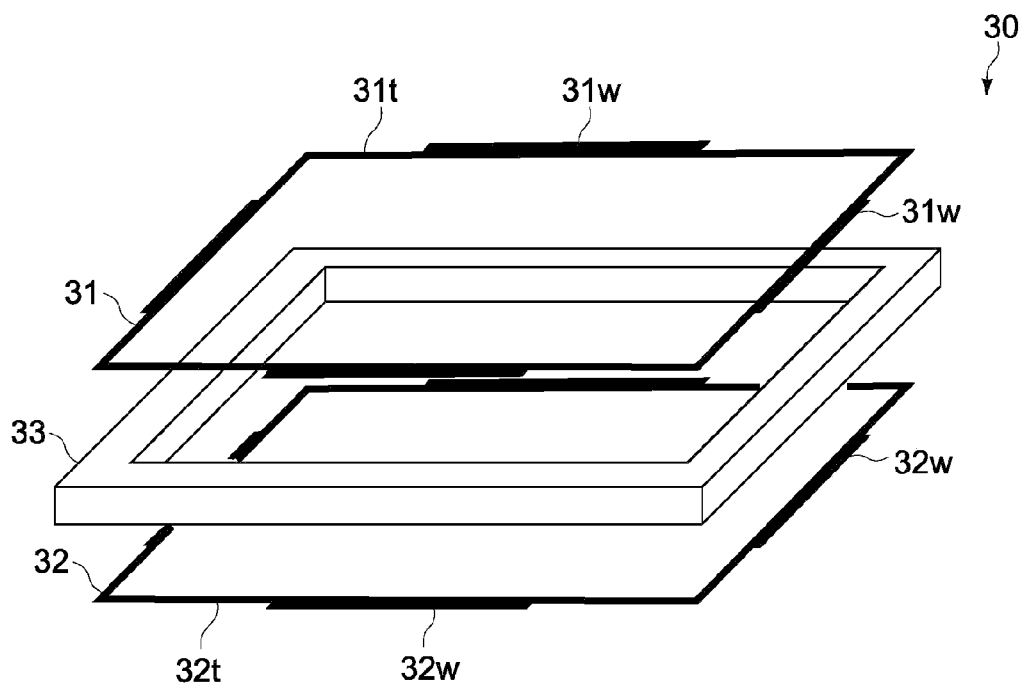
FIG. 3 is an exploded perspective view showing a structure of a pressure-sensitive sensor according to the embodiment of the present disclosure.

The pressure-sensitive sensor 30 is provided between the sensor panel 10 and the casing 20. FIG. 3 is an exploded perspective view showing a basic structure of the pressure-sensitive sensor 30. The pressure-sensitive sensor 30 includes a first electrode 31, a second electrode 32, and an elastic member 33.

The first electrode 31 is fixed on the sensor panel 10 side, and the second electrode 32 is fixed on the casing 20 side. The elastic member 33 is provided between the sensor panel 10 and the casing 20 and elastically supports the sensor panel 10 with respect to the casing 20.

In this embodiment, the first and second electrodes 31 and 32 are provided at upper and lower surfaces of the elastic member 33, respectively, while opposing each other with the elastic member 33 interposed therebetween. The first electrode 31 is consecutively formed annularly in a rectangular shape and includes a first wiring area 31t having a first line width and a second wiring area 31w having a second line width larger than the first line width. The second electrode 32 is also consecutively formed annularly in a rectangular shape and includes a first wiring area 32t having the first line width and a second wiring area 32w having the second line width larger than the first line width. It should be noted that details of the first and second wiring areas 31t, 32t, 31w, and 32w will be described later.

The first and second electrodes 31 and 32 are connected to the controller 50, and a capacitance between the first and second electrodes 31 and 32 is calculated by the controller 50. Alternatively, either one of the first and second electrodes 31 and 32 may be connected to the controller 50 so that a capacitance between the first and second electrodes 31 and 32 is calculated by connecting the other one of the first and second electrodes 31 and 32 to a constant potential (e.g., ground).

The pressure-sensitive sensor 30 is formed annularly along the sides of the input operation surface 10a. In this embodiment, the first and second electrodes 31 and 32 and the elastic member 33 are formed annularly along the circumference of the input operation surface 10a sensor panel 10). In the example shown in the figure, the input operation surface 10a is rectangular, and the elastic member 33 is formed annularly in a rectangular shape having a constant width and thickness along the sides of the input operation surface 10a.

The elastic member 33 is formed of a material having a small amount of residual strain and a high restoration rate (restoration speed), for example. As this type of material, silicone rubber or urethane rubber can be used, for example. It is desirable for the elastic member 33 to have a Young's modulus of 0.001 to 2 MPa and a response speed with a return time of 400 ms or less. If the Young's modulus falls below 0.001 MPa, there is a fear that a pressing operation will be detected erroneously even when the operator is merely touching the input operation surface directly or indirectly. If the Young's modulus exceeds 2 MPa, there is a fear that operability is lowered since a large pressing force becomes necessary.

If the return time is slower than 400 ms, it takes time to detect a pressing operation by an input operator, with the result that it becomes to detect a press at a time a quick input operation is made, operability is lowered, and it becomes difficult to detect consecutive operations such as a double-click. Moreover, it is desirable for the elastic member 33 to have a compressive residual strain that is about 5% the initial strain at maximum in addition to the Young's modulus and the response speed.

If the compressive residual strain is larger than 5%, the sensitivity of the pressure-sensitive sensor 30 is lowered accompanying the degradation of the elastic member 33 due to long-term use. Therefore, by setting the compressive residual strain to be about 5% at maximum, a pressure-sensitive sensor 30 whose sensitivity can be maintained sufficiently even during long-term use can be obtained, and operation characteristics can be prevented from being deteriorated.

Here, the Young's modulus was measured based on an experimental method conforming to JIS (Japanese Industrial Standards) K6254. The compressive residual strain was measured based on an experimental method conforming to JIS K6401 (experimental method in which compressive residual strain is 50%). Moreover, the thickness of the elastic member 33 may be set to be, for example, about 0.1 mm to 5 mm depending on the size of the sensor panel 10. For example, the elastic member 33 having a thickness of about 0.1 to 5 mm can be used if the touch panel is 5 inches or less, and the elastic member 33 having a thickness of about 0.5 mm to 5 mm can be used if the touch panel is 5 inches or more. The elastic member 33 only needs to be displaced about 10%, for example, and only needs to be displaced about 50 μm when the elastic member 33 having a thickness of 0.5 mm is used, for example.

In this embodiment, "PORON" (registered trademark) available from INOAC CORPORATION is used as the elastic member 33. Specifically, "PORON" (registered trademark) SS10P, SS24P, SS32P, MS40P, or the like is used.

In this embodiment, the elastic member 33 is formed (annularly) in a frame shape corresponding to the circumferential configuration of the sensor panel 10. By annularly forming the elastic member 33, it becomes possible to prevent an external foreign substance from entering a gap between the sensor panel 10 and the casing 20 or a gap between the sensor panel 10 and the display panel 40. Since the seal function can thus be obtained by the elastic member 33, reliability of the information processing apparatus 100 can be enhanced.

The elastic member 33 is fixed to the first electrode 31 fixed to the sensor panel 10 and the second electrode 32 fixed to the casing 20 via adhesive layers. The adhesive layer may be an adhesive, a two-sided adhesive sheet, or the like. Alternatively, the first and second electrodes 31 and 32 may be directly formed on the elastic member 33, and the upper and lower surfaces of the elastic member 33 may be bonded to the sensor panel 10 and the casing 20 via the first and second electrodes 31 and 32.

Figure 4:
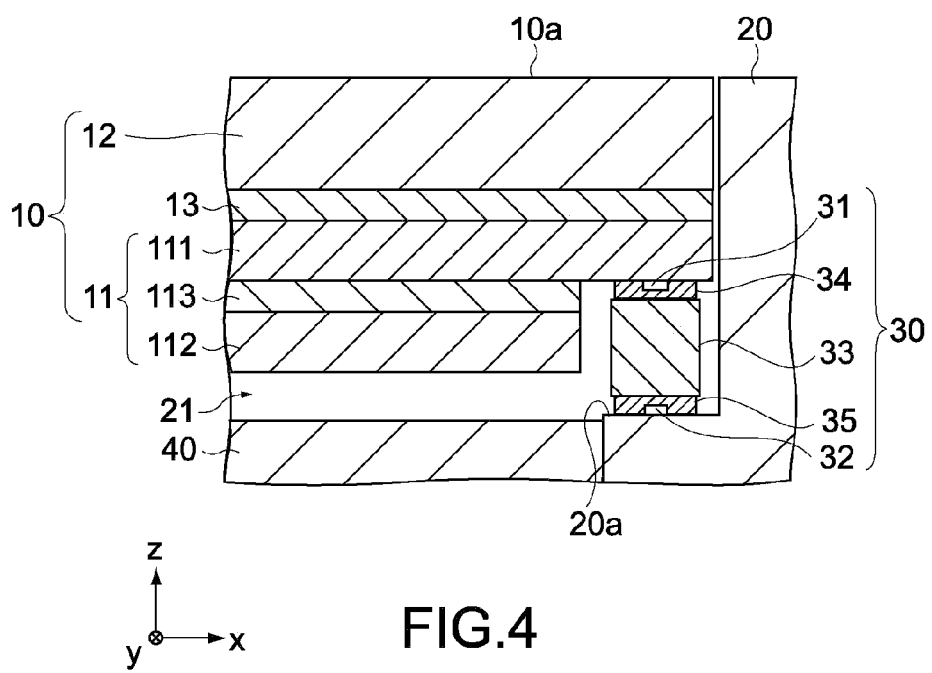
FIG. 4 is a cross-sectional diagram of a main portion of the information processing apparatus, the diagram showing a structural example of the pressure-sensitive sensor.

Further, the first electrode 31 provided on the sensor panel 10 side may be formed on one of the electrode substrates of the sensor sheet 11 as shown in FIG. 4. FIG. 4 is a cross-sectional diagram of a main portion of the information processing apparatus, the diagram showing an example where the first electrode 31 of the pressure-sensitive sensor 30 is formed on the upper-layer-side electrode substrate of the sensor sheet 11.

In FIG. 4, the sensor sheet 11 includes a first electrode substrate 111 on an upper layer side, a second electrode substrate 112 on a lower layer side, and an adhesive layer 113 that bonds the electrodes substrates 111 and 112 to each other. The first electrode substrate 111 is formed in a size almost the same as the top plate 12 and bonded to the top plate 12 via an adhesive layer 13. The second electrode substrate 112 has a smaller area than the first electrode substrate 111, and an annular area in which the pressure-sensitive sensor 30 is provided is formed around the second electrode substrate 112. On inner surface sides of the first electrode substrate 111 and the second electrode substrate 112 facing each other, wiring patterns formed of a conductive material such as ITO (Indium Tin Oxide) and silver (Ag) are formed. The first electrode 31 is formed on the inner surface side of the first electrode substrate 111 and formed simultaneous to the wiring pattern that forms the first electrode substrate 111, for example. The second electrode 32 is formed at a circumference of the bottom portion inside the casing 20 and formed of the same conductive material as that described above. The upper surface side of the elastic member 33 is bonded to the first electrode 31 and the first electrode substrate 111 via an adhesive layer 34, and the lower surface side of the elastic member 33 is bonded to the second electrode 32 and the casing 20 via an adhesive layer 35.

As a pressing force acts on the input operation surface 10a in the z-axis direction, the elastic member 33 is compressively deformed, and a distance between the electrodes 31 and 32 changes based on the deformation amount. The pressure-sensitive sensor 30 detects the pressing force as a change in the capacitance between the electrodes 31 and 32. In other words, by detecting the change in the capacitance between the electrodes 31 and 32 before and after the deformation of the elastic member 33, a pressing force or pressing amount in the z-axis direction input to the input operation surface 10a is judged. Accordingly, in-plane xy coordinates of an operation position of the sensor panel 10 and the pressing force at the operation position can be detected at the same time when a user operation is made on the input operation surface 10a, with the result that information input operations that differ depending on the pressing operation position become possible.

In the sensor apparatus in which the pressure-sensitive sensor 30 is provided at the circumferential portion of the sensor panel 10, variations are apt to be caused in detection characteristics of the pressure-sensitive sensor 30 depending on the in-plane position of the input operation surface 10a. Such a problem changes a detection sensitivity for a pressing operation depending on the operation position, which becomes a cause for the lowering of operability.

Figure 5:
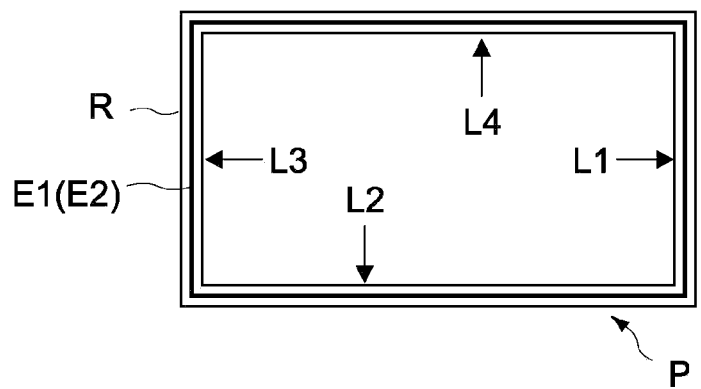
FIG. 5 is a plan view of the pressure-sensitive sensor according to a comparative example.

In descriptions below, pressure-sensitive characteristics within a panel will be described as a comparative example using a pressure-sensitive sensor P shown in FIG. 5.

Figure 6:
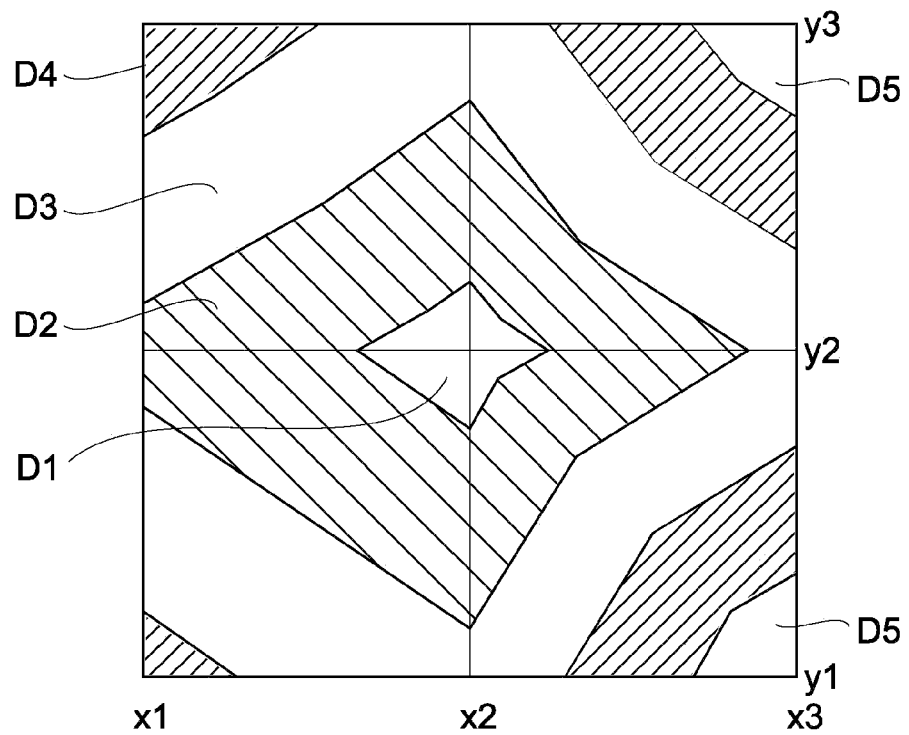
FIG. 6 is a diagram for explaining detection characteristics of the pressure-sensitive sensor according to the comparative example, the diagram showing an in-plane sensitivity distribution.

The pressure-sensitive sensor P includes a rectangular elastic member R including short sides L1 and L3 and long sides L2 and L4 and first and second electrodes E1 and E2 facing each other with the elastic member R interposed therebetween. The width of the elastic member R is 1.4 mm, and the Young's modulus is 0.14 MPa. The first and second electrodes E1 and E2 are formed with uniform width (0.21 mm) and thickness along the entire circumference. The pressure-sensitive sensor P was placed under a glass panel having a long side of 90 mm, a short side of 54 mm, and a thickness of 1.1 mm, and a force corresponding to a capacity change of 50 g was imparted to a center portion of the panel. FIG. 6 shows a distribution of a capacity change of the pressure-sensitive sensor P within the plane of the panel at this time.

In FIG. 6, D1 to D4 are capacity change areas that indicate predetermined capacity change amounts, and D1 is 0.15 to 0.20 pF, D2 is 0.20 to 0.25 pF, D3 is 0.25 to 0.30 pF, and D4 is 0.30 to 0.35 pF, and D5 is 0.35 to 0.40 pF. x1 to x3 and y1 to y3 represent xy coordinates within the plane of the panel, and (x2, y2) corresponds to the center portion of the panel in this case. As shown in FIG. 6, the capacity change amount between the first and second electrodes E1 and E2 tends to become smaller toward the center portion of the panel, and a detection sensitivity for a pressing operation tends to become smaller at the center portion than at the circumferential portion of the panel.

Figure 7:
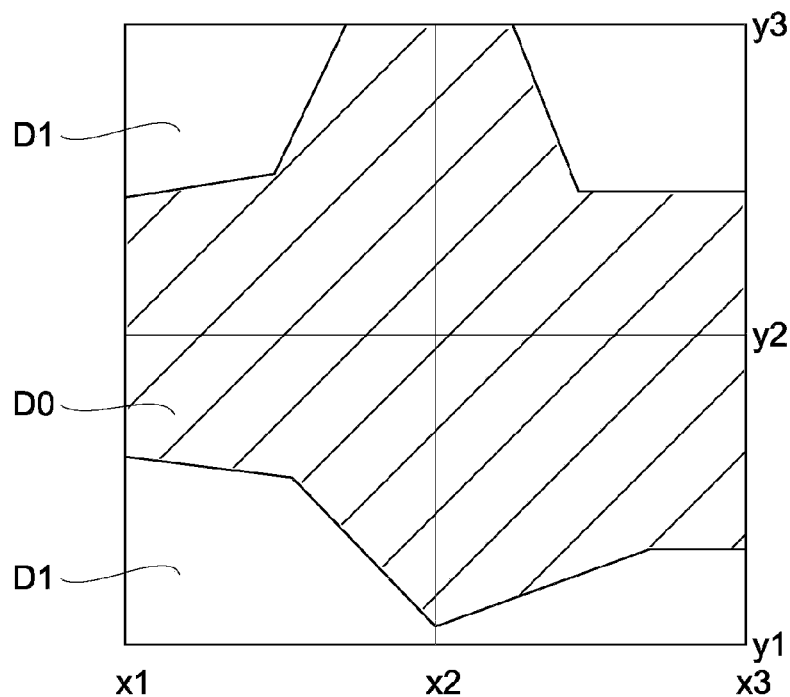
FIG. 7 is a diagram for explaining the detection characteristics of the pressure-sensitive sensor according to the comparative example, the diagram showing the in-plane sensitivity distribution.

The detection sensitivity for a pressing operation also varies depending on the width of the elastic member R, the thickness of the panel to which an input operation is made, and the like. FIG. 7 shows the in-plane detection sensitivity distribution at a time the width of the elastic member R is 1.7 mm.

Figure 8:
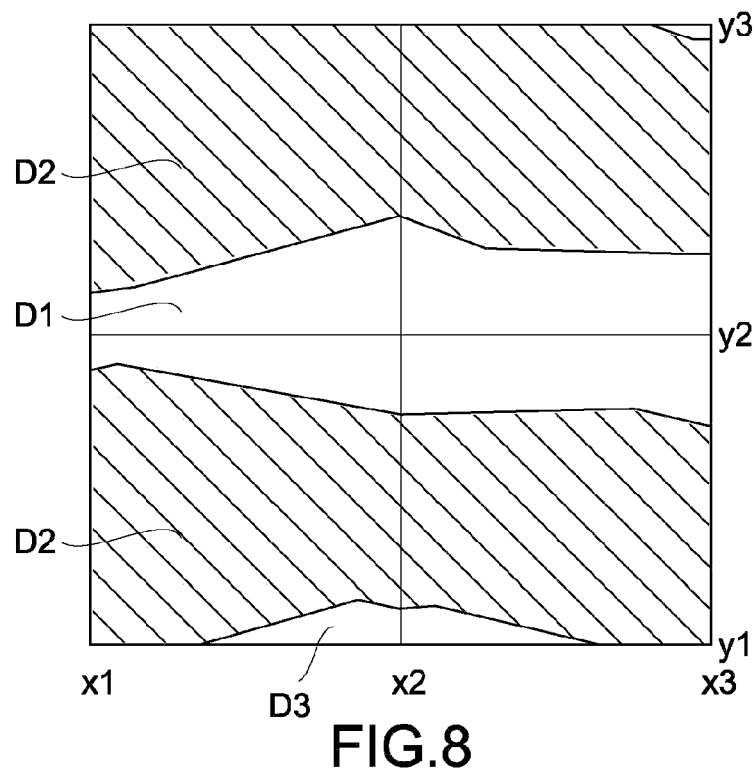
FIG. 8 is a diagram for explaining the detection characteristics of the pressure-sensitive sensor according to the comparative example, the diagram showing the in-plane sensitivity distribution.

In FIG. 7, D0 represents a capacity change area of 0.10 to 0.15 pF. On the other hand, FIG. 8 shows the in-plane detection sensitivity distribution at a time the thickness of the panel is 0.55 mm.

As shown in FIG. 7, since the sinking amount of the panel decreases as the width of the elastic member R increases, variations of the in-plane detection sensitivity are suppressed. However, since the capacity change amount at the center portion of the panel becomes smaller than the experimental result of FIG. 6, the detection sensitivity at the center portion of the panel cannot be enhanced. On the other hand, as shown in FIG. 8, since the rigidity of the panel itself becomes lower as the thickness of the panel decreases, an influence of the deflection of the panel itself appears. Accordingly, the area with a small capacity change amount (D1) becomes larger than the experimental result of FIG. 6, with the result that the detection sensitivity cannot be enhanced.

Figure 9:
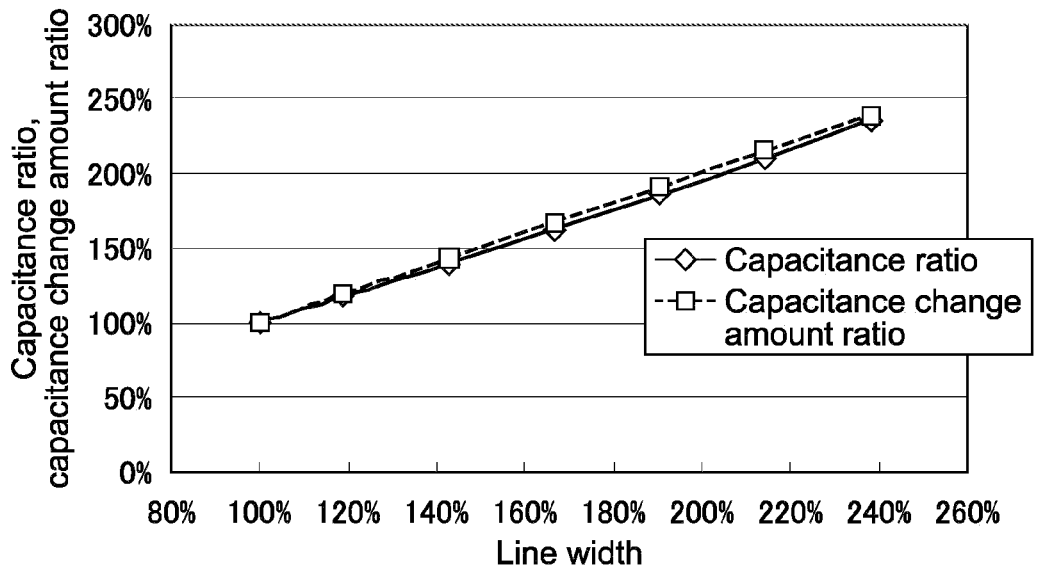
FIG. 9 is a diagram for explaining the detection characteristics of the pressure-sensitive sensor according to the comparative example, the diagram showing a relationship between a line width of an electrode and a capacitance.

Further, as a method of enhancing a detection sensitivity for a pressing operation, there is a method of increasing a capacity change amount of the pressure-sensitive sensor P. When the capacity change amount is represented by $\Delta C$, the relationship of $\Delta C = S/\Delta d$ ($\epsilon$: dielectric constant, S: electrode opposing area, $\Delta d$ = compressive deformation amount of elastic member) is established. Based on this relationship, when $\epsilon$ and $\Delta d$ is fixed, $\Delta C$ can be increased by increasing the electrode opposing area S. Although there is a need to increase the line widths of the electrodes E1 and E2 for increasing the electrode opposing area S, not only the capacity change amount but also the capacitance between the electrodes E1 and E2 also increases in this case. FIG. 9 shows a relationship between a capacitance ratio and a capacitance change ratio at a time the line width of the electrodes E1 and E2 and a line width of 0.21 mm are used as a standard. In general, an upper limit is set for a capacitance of a touch panel control IC, and an S/N (signal-noise ratio) becomes higher as the capacitance becomes lower. Therefore, it is desirable to increase the capacity change amount without increasing the capacitance.

Figure 10:
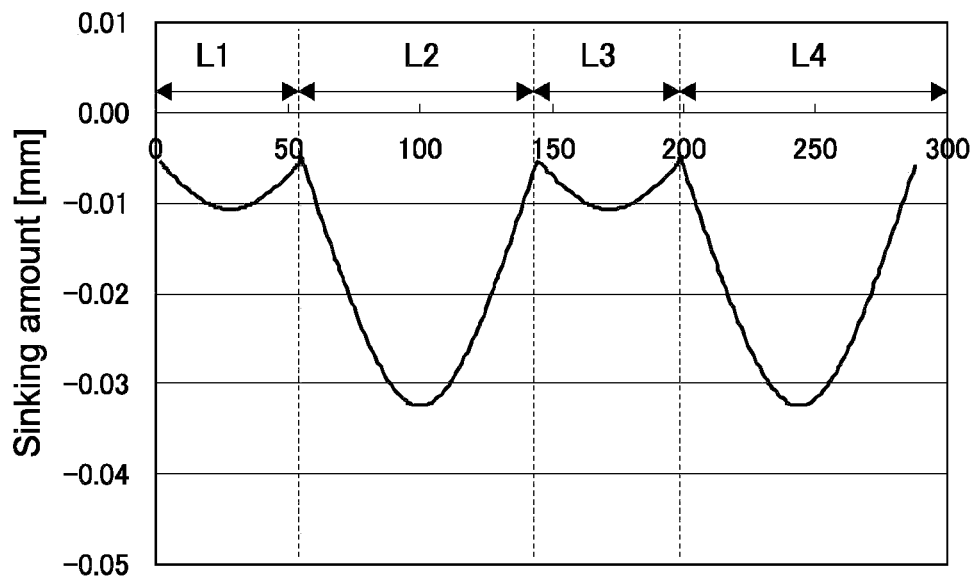
FIG. 10 is a diagram for explaining the detection characteristics of the pressure-sensitive sensor according to the comparative example, the diagram showing a relationship between sides of an elastic member and deformation amounts thereof.

Next, FIG. 10 shows a sinking amount of the sides L1 to L4 in the longitudinal direction of the electrodes E1 and E2 at a time a force corresponding to a weight 250 g is applied to the center portion of the panel. It can be seen from FIG. 10 that the sinking amounts are larger at the center portions of the sides than at the end portions thereof, and the sinking amounts of the long sides L2 and L4 at the center portions are the largest in particular. Therefore, by increasing the electrode opposing area (S) of a portion with a large sinking amount ($\Delta d$), the capacity change amount at the center portion of the panel can be increased, with the result that stable detection characteristics can be obtained irrespective of a pressing position.

In this regard, in the pressure-sensitive sensor 30 of this embodiment, the first and second electrodes 31 and 32 include the first wiring areas 31t and 32t formed with the first line width and the second wiring areas 31w and 32w formed with the second line width larger than the first line width as shown in FIG. 3. The second wiring areas 31w and 32w are formed at the center portions of the sides of the sensor panel 10 (pressure-sensitive sensor 30) while opposing each other across the elastic member 33. The first wiring areas 31t and 32t are formed between the second wiring areas 31w and 32w of the sides while opposing each other across the elastic member 33.

Figure 11:
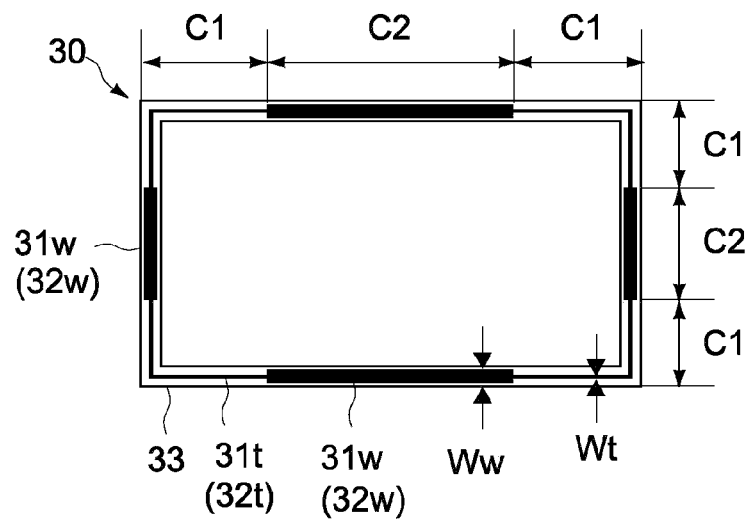
FIG. 11 is a plan view showing a structure of the pressure-sensitive sensor according to the first embodiment of the present disclosure.

In this embodiment, by partially differentiating the wiring widths of the first and second electrodes 31 and 32, the first area (C1) having the first capacitance and the second area (C2) having the second capacitance larger than the first capacitance are formed between the first and second electrodes 31 and 32. The first area corresponds to an opposing area with respect to the first wiring areas 31t and 32t, and the second area corresponds to an opposing area with respect to the second wiring areas 31w and 32w. For example, the line widths of the first wiring areas 31t and 32t are represented by Wt and the line widths of the second wiring areas 31w and 32w are represented by Ww (Wt<Ww) as shown in FIG. 11. A formation area of the first wiring areas 31t and 32t corresponds to the first area C1, and a formation area of the second wiring areas 31w and 32w corresponds to the second area C2.

In the structure described above, the change of the capacitance between the first and second electrodes 31 and 32 that is detected based on an input of a pressing force with respect to the input operation surface 10a differs between the first area and the second area, and the change of the capacitance is larger in the second area than in the first area. Therefore, by setting the second area in an area with a low detection sensitivity of a pressing force, for example, stable detection characteristics can be obtained irrespective of a pressing position.

In particular, the pressure-sensitive sensor 30 of this embodiment includes the second area at the center portion of each side and the first area on both ends of each side sandwiching the second area. Accordingly, stable detection characteristics can be obtained irrespective of a pressing position with respect to the polygonal input operation surface 10a.

Figure 12:
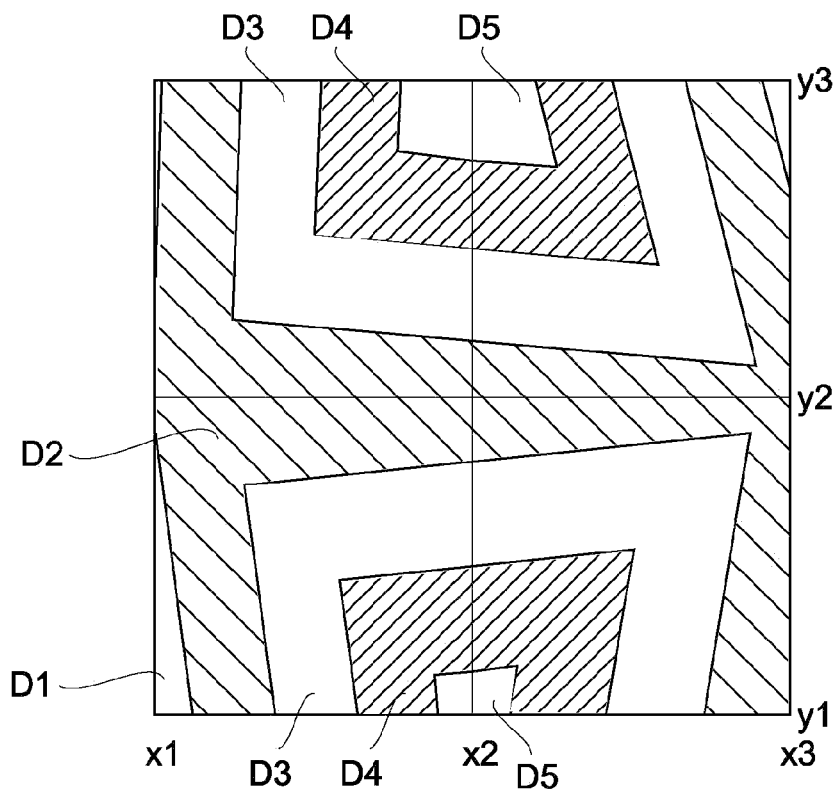
FIG. 12 is a diagram for explaining the detection characteristics of the pressure-sensitive sensor according to the first embodiment of the present disclosure, the diagram showing the in-plane sensitivity distribution.

FIG. 12 shows a pressing detection sensitivity distribution within the plane of the panel at a time the pressure-sensitive sensor 30 shown in FIG. 11 is provided below the panel (long side 90 mm, short side 54 mm, and thickness 1.1 mm). Here, Wt is 0.15 mm, Ww is 0.45 mm, the length of the second wiring areas 31w and 32w is 50 mm on the long sides and 10 mm on the short sides, and the width of the elastic member 33 is 1.7 mm. As shown in FIG. 12, according to this embodiment, it is possible to enhance a detection sensitivity at the center portion of the panel and improve pressing detection characteristics across the entire panel surface as compared to the cases of FIGS. 6 to 8.

Figure 13:
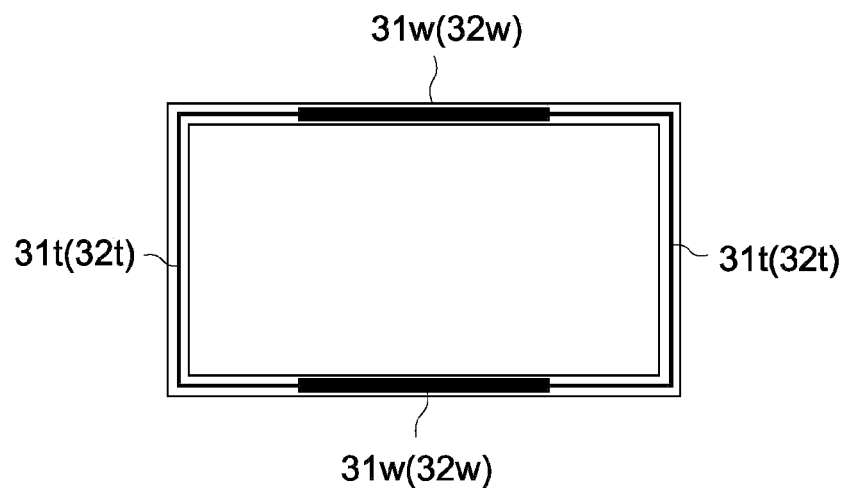
FIG. 13 is a plan view showing another structure example of the pressure-sensitive sensor according to the first embodiment of the present disclosure.

The second wiring areas 31w and 32w do not need to be formed on each side of the sensor panel 10 and only need to be formed on at least a pair of opposite sides (e.g., long sides) as shown in FIG. 13. Moreover, the line widths, formation areas, and the like of the first wiring areas 31t and 32t and the second wiring areas 31w and 32w are not particularly limited and are set as appropriate based on the size of the sensor panel, a required capacity change amount, an in-plane distribution thereof, and the like.

Figure 14:
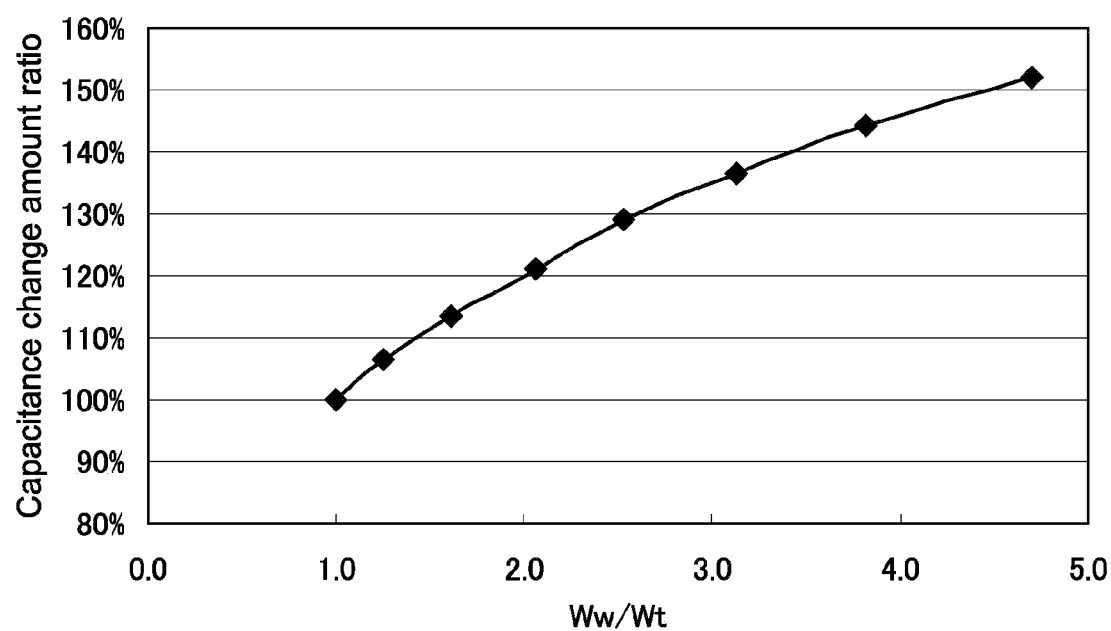
FIG. 14 is a diagram for explaining the detection characteristics of the pressure-sensitive sensor according to the first embodiment of the present disclosure, the diagram showing a relationship between a line width ratio and capacitance change of electrodes.

By setting, with the line width of the first wiring areas 31t and 32t being represented by Wt and the line width of the second wiring areas 31w and 32w being represented by Ww, the line width ratio (Ww/Wt) to be 1.4 or more, the capacity change amount can be increased 10% or more as compared to the case where the line width ratio is 1 as shown in FIG. 14. FIG. 14 is a diagram showing a relationship between the line width ratio (Ww/Wt) and a capacity change amount ratio of the wiring areas, the diagram showing an example where an area corresponding to ⅔ the length of the long sides of the pressure-sensitive sensor constitutes the second wiring area. It can be seen that when Ww/Wt=4.5, the capacity change amount increases 50%, and the sensitivity is significantly improved.

According to this embodiment, by adjusting the lengths and line widths of the wiring areas, the capacitance between the first and second electrodes 31 and 32 can be formed with the same size as the total capacitance at the time Ww/Wt is 1. In this case, it becomes possible to enhance a detection sensitivity for a pressing operation without increasing the total capacitance of the pressure-sensitive sensor.

Furthermore, according to this embodiment, since the sensor sheet 11 is constituted of a capacitance-type touch panel, the controller 50 can be structured by the same control circuit as a circuit that processes detection signals of the pressure-sensitive sensor 30. Specifically, the controller 50 detects a contact or adjacency of the operator to the input operation surface 10a by supplying a signal voltage (pulse, RF, etc.) to the electrode substrates 111 and 112 of the sensor sheet 11. At this time, by time-divisionally supplying the signal voltage to the electrodes of the sensor sheet 11 and the pressure-sensitive sensor 30, the xy positional coordinates of the operator and a pressing force (pressing amount) can be detected with a single control circuit.

The detection method of the sensor sheet 11 may be a so-called mutual method or self method. In the mutual method, the xy coordinates of the operator are specified by detecting a capacitance or a change thereof in an intersecting area between the electrode substrates 111 and 112. On the other hand, in the self method, the xy coordinates of the operator are specified by detecting a capacitance or a change thereof between the operator and the electrode substrates 111 and 112.

Second Embodiment

Figure 15:
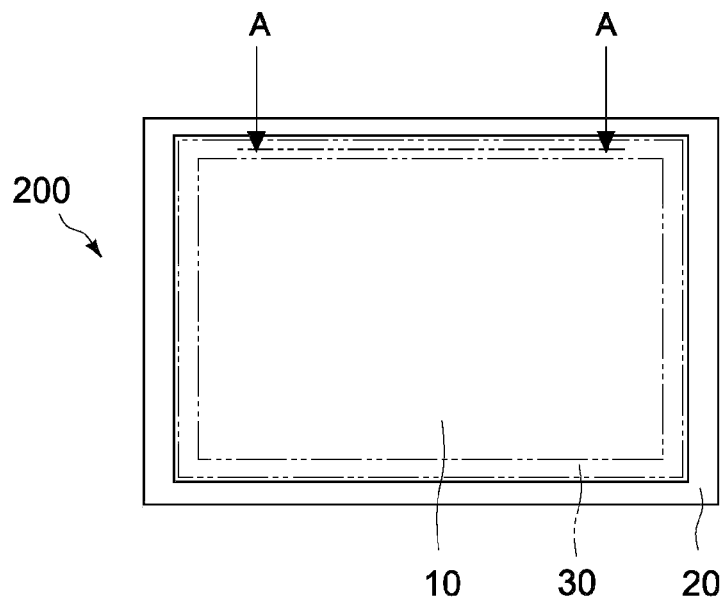
FIG. 15 is a plan view of a sensor apparatus according to a second embodiment of the present disclosure.
Figure 16:
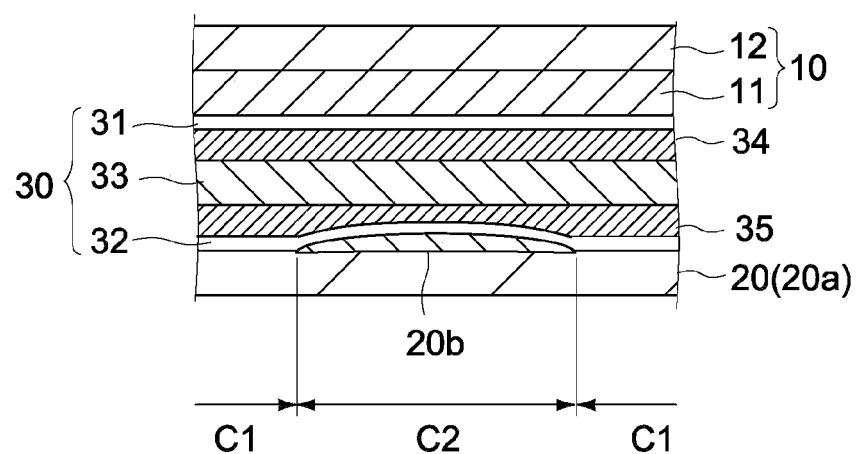
FIG. 16 is a cross-sectional diagram taken along the line A-A of FIG. 15.

FIG. 15 is a plan view of an information processing apparatus (sensor apparatus) according to a second embodiment of the present disclosure. FIG. 16 is a cross-sectional diagram taken along the line A-A of FIG. 15. Hereinafter, structures different from those of the first embodiment will mainly be described. Also, structures that are the same as those of the above embodiment are denoted by the same symbols, and descriptions thereof will be omitted or simplified.

In an information processing apparatus 200 of this embodiment, the pressure-sensitive sensor 30 including the first area and the second area is provided between the sensor panel 10 and the casing 20 as in the first embodiment. The first area is formed in areas including four corners of the rectangular sensor panel 10 and peripheries thereof, and the second area is formed at the center portion of the sides of the sensor panel 10. A bump portion 20b is formed at a bottom circumferential portion 20a of the casing 20 corresponding to the second area.

The bump portion 20b has a function of locally bringing the second electrode 32 close to the first electrode 31 side by raising the center portion of each side of the pressure-sensitive sensor 30 bonded to the bottom circumferential portion 20a of the casing 20. As a result, by partially differentiating the opposing distances of the first and second electrodes 31 and 32, the first area C1 having the first capacitance and the second area C2 having the second capacitance larger than the first capacitance are formed. In this embodiment, the first and second electrodes 31 and 32 face each other at a first opposing distance in the first area C1 and at a second opposing distance smaller than the first opposing distance in the second area C2.

As in the first embodiment, it is possible to enhance a detection sensitivity for a pressing operation at the center portion of each side of the sensor panel 10, enhance a detection sensitivity at the center portion of the plane of the sensor panel 10, and improve pressing detection characteristics across the entire panel surface in the second embodiment.

The bump portion 20b does not need to be formed integrally with the casing 20 and may be constituted of a member different from the casing 20. The height, length, and width of the bump portion 20b are not particularly limited and can be set as appropriate based on the shape and size of the sensor panel 10 and a desired sensitivity distribution.

Third Embodiment

Figure 17:
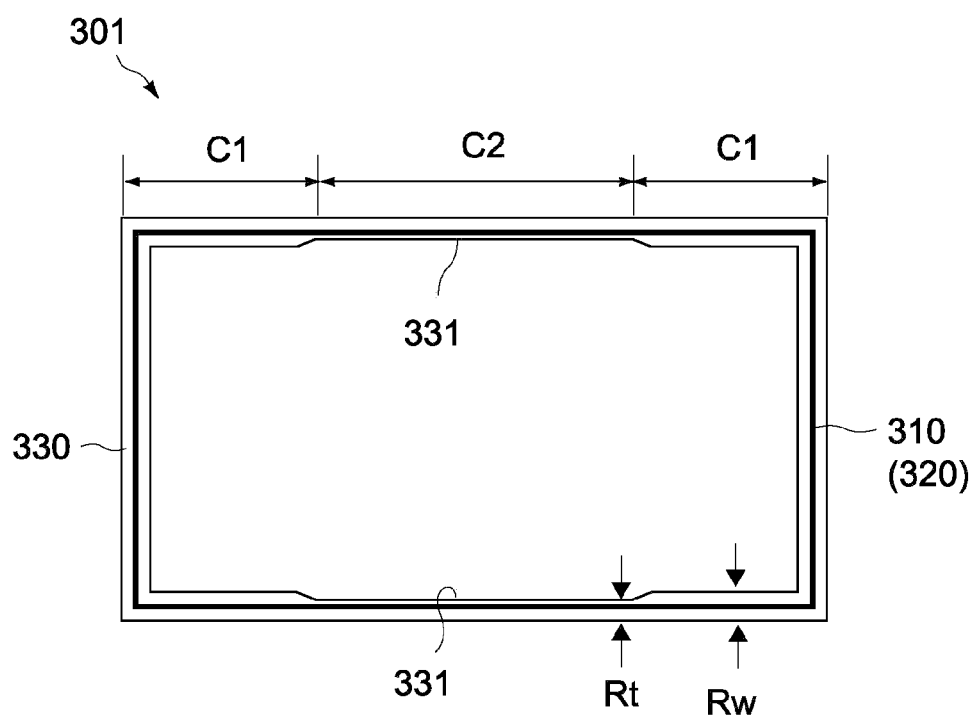
FIG. 17 is a plan view of a pressure-sensitive sensor according to a third embodiment of the present disclosure.

FIG. 17 is a plan view of a pressure-sensitive sensor according to a third embodiment of the present disclosure. Hereinafter, structures different from those of the first embodiment will mainly be described. Also, structures that are the same as those of the above embodiments are denoted by the same symbols, and descriptions thereof will be omitted or simplified.

A pressure-sensitive sensor 301 of this embodiment includes an annular elastic member 330 having a rectangular shape, a first electrode 310 provided on an upper surface of the elastic member 330, and a second electrode 320 provided on a lower surface of the elastic member 330. The first and second electrodes 310 and 320 are formed with uniform width and thickness throughout the entire circumference and face each other with the elastic member 330 interposed therebetween. On the other hand, the elastic member 330 is formed with a uniform thickness throughout the entire circumference, and notches 331 are formed on inner-circumferential-side center portions of a pair of long sides.

The width Rt of the inner-circumferential-side center portions of the long sides of the elastic member 330 is smaller than the width Rw of other areas. Accordingly, a compressive deformation in the thickness direction is made easier. As a result, at the time a pressing force is detected by the pressure-sensitive sensor 301, the opposing distance between the first and second electrodes 310 and 320 at the center portions of the long sides of the elastic member 330 becomes shorter than that at other portions. Thus, it becomes possible to detect a larger capacitance change than at other portions. In the pressure-sensitive sensor 301 of this embodiment, areas where the notches 331 are not formed correspond to the first area C1 having the first capacitance, and areas where the notches 331 are formed correspond to the second area C2 having the second capacitance larger than the first capacitance at the time of the compressive deformation.

In this embodiment, it is possible to enhance a detection sensitivity for a pressing operation at the center portion of each side of the sensor panel, enhance a detection sensitivity at the center portion of the plane of the sensor panel, and improve pressing detection characteristics across the entire surface of the panel as in the first embodiment.

It should be noted that the notches 331 are not limited to the example where the notches 331 are formed only on the long sides of the elastic member 330 and may be formed on all sides including the short sides. Moreover, the notches 331 are not limited to the example where the notches 331 are formed on the inner circumferential sides of the sides and may be formed on the outer circumferential sides or both the inner and outer circumferential sides of the sides.

Heretofore, the embodiments of the present disclosure have been described. However, the present disclosure is not limited thereto and may be variously modified based on the technical idea of the present disclosure.

For example, although the above embodiments have described the example where the sensor apparatus is applied to the information processing apparatus, the present disclosure is not limited thereto, and the sensor apparatus may be applied to an input apparatus for moving a pointer on a screen (mouse). In this case, the pressure-sensitive sensor can be used as a sensor that detects a click operation. In this case, the sensor panel does not always need to be formed of a transparent material.

Figure 18A:
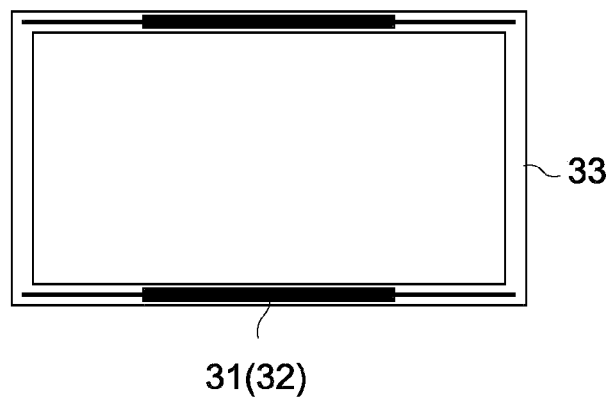
FIGS. 18A and 18B are plan views of the pressure-sensitive sensor showing modified examples of the embodiment of the present disclosure.
Figure 18B:
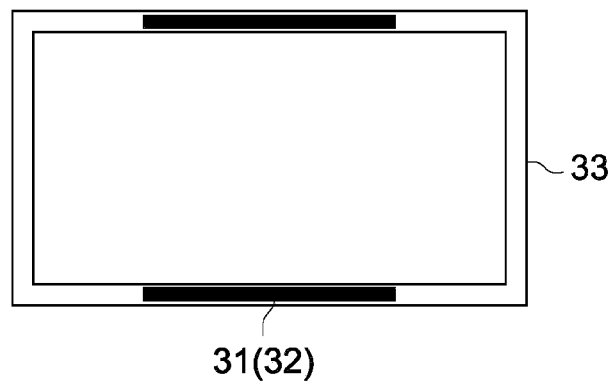

Further, although the elastic member of the pressure-sensitive sensor has been formed annularly in this embodiment, the elastic member may be constituted of a plurality of members independently arranged at four corners of the sensor panel, for example. The first and second electrodes 31 and 32 are also not limited to the annular shape and may be arranged only on a pair of opposite sides (e.g., long sides) facing each other as shown in FIGS. 18A and 18B, for example.

The first wiring areas 31$t$ and 32$t$ that form the first area C1 may be formed only on either one of the first and second electrodes 31 and 32. Accordingly, positioning of the electrodes becomes simple, and an opposing area between the electrodes can be stably secured. Moreover, the second wiring areas 31$w$ and 32$w$ that form the second area C2 are not limited to the shape in which a wide portion continues linearly and may take a form in which the wide portion and a narrow portion are formed alternately, for example.

Furthermore, in the above embodiments, the first and second areas have been formed by differentiating the opposing areas and distances of the first and second electrodes. However, the first and second areas may instead be formed by differentiating a dielectric constant between the electrodes for each area.

Figure 19A:
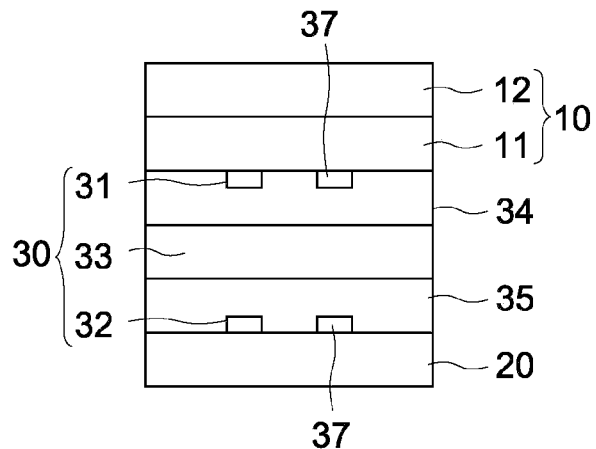
FIGS. 19A to 19C are cross-sectional diagrams of a main portion of the sensor apparatus showing modified examples of the structure of the embodiment of the present disclosure.
Figure 19B:
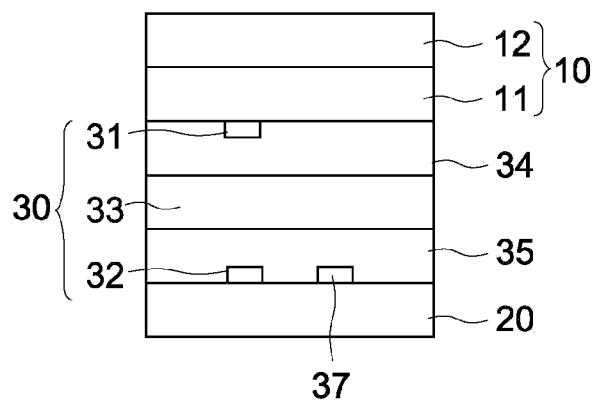

The method of detecting a pressing operation by the pressure-sensitive sensor may either be a mutual method or a self method. In the mutual method, a capacitor is constituted of the first and second electrodes 31 and 32 opposing each other with the elastic member 33 interposed therebetween as shown in FIG. 19A, and a change of the capacitance between the electrodes is detected. In the self method, as shown in FIG. 19B, one of the first and second electrodes 31 and 32 (e.g., first electrode 31) is used as a ground potential to detect a change of the capacitance caused by an approach of the one electrode to the other electrode. In either method, for alleviating an influence of external noises, a ground electrode (shield electrode) 37 may be provided on an outer circumferential side of the first and second electrodes 31 and 32.

Figure 19C:
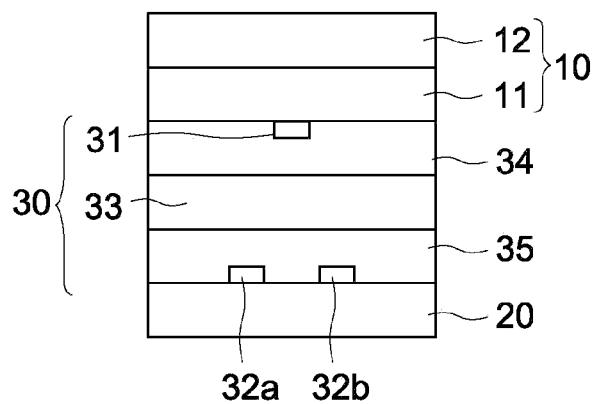

Furthermore, in the mutual method, as shown in FIG. 19C, the second electrode may be constituted of two electrodes 32$a$ and 32$b$, and the first electrode 31 may be provided between the electrodes 32$a$ and 32$b$. In this case, the first electrode 31 is used as a ground potential, and the approach of the first electrode 31 to the electrodes 32$a$ and 32$b$ is detected as a change in the capacitance between the electrodes 32$a$ and 32$b$.

The present disclosure contains subject matter related to that disclosed in Japanese Priority Patent Application JP 2010-209273 filed in the Japan Patent Office on Sep. 17, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sensor apparatus, comprising:
a sensor panel that includes an input operation surface and is configured to detect positional coordinates of a detection object that comes into contact with the input operation surface;
a casing; and
a pressure-sensitive sensor that includes (a) a first electrode fixed on a sensor panel side, (b) a second electrode fixed on a casing side, and (c) an elastic member between the sensor panel and the casing, the elastic member elastically supporting the sensor panel with respect to the casing, the pressure sensitive sensor being configured to detect a pressing force that is input to the input operation surface as a change in a capacitance between the first electrode and the second electrode,
wherein,
the pressure-sensitive sensor has first and second areas between the first electrode and the second electrode, the first area having a first capacitance and the second area having a second capacitance, the second capacitance being larger than the first capacitance,
the first and second areas are located along a circumferential region of the sensor panel, and
the second area is located along a center axis of the pressure-sensitive sensor.

2. The sensor apparatus according to claim 1, wherein:
the input operation surface has a polygonal shape having at least a pair of opposite sides, and
the pressure-sensitive sensor is formed annularly along sides of the sensor panel and includes the second area at a center portion of at least each of the pair of opposite sides and the first area at both ends of each of the opposite sides, the first area sandwiching the second area.

3. The sensor apparatus according to claim 2, wherein the first electrode and the second electrode face each other with a first opposing area being set in-between in the first area and with a second opposing area larger than the first opposing area being set in-between in the second area.

4. The sensor apparatus according to claim 2, wherein the first electrode and the second electrode face each other with a first opposing distance being set in-between in the first area and with a second opposing distance shorter than the first opposing distance being set in-between in the second area.

5. The sensor apparatus according to claim 1, wherein the sensor panel is a capacitance-type sensor panel that electrostatically detects a position at which an input operation is made.

6. The sensor apparatus according to claim 1, further comprising a controller that is electrically connected to the sensor panel and the pressure-sensitive sensor, the controller being configured to generate a control signal related to a pressing operation applied to the input operation surface based on an output of the sensor panel and an output of the pressure-sensitive sensor.

7. An information processing apparatus, comprising:
a sensor panel that includes an input operation surface and is configured to detect positional coordinates of a detection object that comes into contact with the input operation surface;
a casing;
a pressure-sensitive sensor that includes (a) a first electrode fixed on a sensor panel side, (b) a second electrode fixed on a casing side, and (c) an elastic member between the sensor panel and the casing, the elastic member elastically supporting the sensor panel with respect to the casing, the pressure-sensitive sensor being configured to detect a pressing force that is input to the input operation surface as a change in a capacitance between the first electrode and the second electrode,
wherein,
the pressure-sensitive sensor has first and second areas between the first electrode and the second electrode, the first area having a first capacitance and the second area having a second capacitance, the second capacitance being larger than the first capacitance,
the first and second areas are located along a circumferential region of the sensor panel,
the second area is located along a center axis of the pressure-sensitive sensor, and
a display panel is provided on a back side of the sensor panel and accommodated in the casing.

8. The information processing apparatus of claim 7, wherein:
the input operation surface has a polygonal shape having at least a pair of opposite sides, and
the pressure-sensitive sensor is formed annularly along sides of the sensor panel and includes the second area at a center portion of at least each of the pair of opposite sides and the first area at both ends of each of the opposite sides, the first area sandwiching the second area.

* * * * *